United States Patent
Yoo et al.

(10) Patent No.: US 9,469,763 B2
(45) Date of Patent: Oct. 18, 2016

(54) PHOTO-CURABLE ORGANIC-INORGANIC HYBRID RESIN COMPOSITION

(71) Applicant: Dongjin Semichem Co., Ltd., Incheon (KR)

(72) Inventors: Jae-Won Yoo, Gyeonggi-Do (KR); Dong-Jin Nam, Gyeonggi-Do (KR); Doo-shick Kim, Gyeonggi-Do (KR); Kyung-Min Park, Gyeonggi-Do (KR)

(73) Assignee: DONGJIN SEMICHEM CO., LTD., Incheon (KR)

( * ) Notice: Subject to any disclaimer, the term of this patent is extended or adjusted under 35 U.S.C. 154(b) by 0 days.

(21) Appl. No.: 14/161,778

(22) Filed: Jan. 23, 2014

(65) Prior Publication Data

US 2014/0135413 A1    May 15, 2014

Related U.S. Application Data

(63) Continuation of application No. PCT/KR2012/006035, filed on Jul. 27, 2012.

(30) Foreign Application Priority Data

Aug. 3, 2011 (KR) .................. 10-2011-0077185
Jul. 26, 2012 (KR) .................. 10-2012-0081536

(51) Int. Cl.
| | |
|---|---|
| *C08L 83/10* | (2006.01) |
| *C08G 77/20* | (2006.01) |
| *C08G 77/442* | (2006.01) |
| *C08G 77/24* | (2006.01) |
| *C09J 4/00* | (2006.01) |
| *C08K 5/549* | (2006.01) |

(52) U.S. Cl.
CPC ........ *C08L 83/10* (2013.01); *C09J 4/00* (2013.01); *C08G 77/20* (2013.01); *C08G 77/24* (2013.01); *C08G 77/442* (2013.01); *C08K 5/549* (2013.01)

(58) Field of Classification Search
CPC ..... C08L 83/10; C08G 77/20; C08G 77/442; C08G 77/24; C08K 5/549
See application file for complete search history.

(56) References Cited

U.S. PATENT DOCUMENTS

2009/0256287 A1* 10/2009 Fu et al. .................. 264/447

FOREIGN PATENT DOCUMENTS

JP          2009191268 A    *   8/2009

* cited by examiner

*Primary Examiner* — Sanza McClendon
(74) *Attorney, Agent, or Firm* — Locke Lord LLP; James E. Armstrong, IV; Julie Tabarovsky

(57) ABSTRACT

The present invention relates to a photo-curable organic-inorganic hybrid composition, more particularly to a photo-curable organic-inorganic hybrid resin composition having superior physical properties such as UV resistance, chemical resistance, light transmittance, adhesive property, insulating property, heat resistance, flatness and water resistance and in particular, having excellent heat resistance and adhesive property enabling the composition to endure a thermal deformation caused by a processing temperature change during post-process after a film is cured. Thus, the composition of the invention is suitable for use as an insulating material and an encapsulating material for a protective film of optical devices including display devices and semiconductors.

13 Claims, No Drawings

PHOTO-CURABLE ORGANIC-INORGANIC HYBRID RESIN COMPOSITION

CROSS-REFERENCE TO RELATED APPLICATION

This application is a continuation of International Application No. PCT/KR2012/006035 filed on Jul. 27, 2012, which claims priority to Korean Application No. 10-2011-0077185 filed on Aug. 3, 2011 and Korean Application No. 10-2012-0081536 filed on Jul. 26, 2012, which applications are incorporated herein by reference.

TECHNICAL FIELD

The present invention relates to a photo-curable organic-inorganic hybrid composition, more particularly to a photo-curable organic-inorganic hybrid resin composition having superior physical properties such as UV resistance, chemical resistance, light transmittance, adhesive property, insulating property, heat resistance, flatness and water resistance and in particular, having excellent heat resistance and adhesive property enabling the composition to endure a thermal deformation caused by a processing temperature change during post-process after a film is cured. Thus, the composition of the invention is suitable for use as an insulating material and an encapsulating material for a protective film of optical devices including display devices and semiconductors.

BACKGROUND ART

Optical devices including display devices such as a liquid crystal display device, OLED, etc. are subject to acid or alkaline chemical treatment during their manufacturing process and when wiring electrode layers are prepared, they undergo harsh treatment procedures, for example, a surface is exposed to localized high temperature heating by sputtering. Thus, in order to prevent the devices from being damaged by such treatment, a protective film having resistance is installed on the surface during a series of treatment procedures.

As the protective films have to withstand harsh treatment procedures during the processing, they are required to have excellent adhesive property to a substrates or a lower layer of the protective films, and excellent chemical resistance, light transmittance, insulating property, UV resistance, heat resistance and water resistance. Further, they have to avoid deterioration such as coloring, yellowing and whitening over long period of time, and in a case that the protective films are applied to color filters of color liquid crystal display devices, it would be even better if they can flatten the differences of the color filters.

Thermosetting resin compositions containing a polymer having a glycidyl group have been previously known as a material for forming the protective films having such several performances but because of their weak chemical resistance and heat resistance, they can easily cause cracks including deformation due to contraction and expansion of the protective films when treated with chemicals or locally exposed to high temperatures. The thermosetting resin compositions having a glycidyl group are generally formed into protective films at temperatures higher than 220° C. This process causes a problem if a substrate vulnerable to heat is used, as in organic TFT processing, flexible displays, and OLED processing. In other words, as substrates to be used for flexible display processing cannot withstand high temperatures, protective film-forming conditions should be low temperatures; organic light-emitting devices in the OLED processing are likely to be degraded at high temperatures; and materials used for the organic TFT processing also show vulnerable properties at high temperatures so that the thermosetting resin compositions having a glycidyl group have a difficulty to apply. Accordingly, there is a need of developing a material capable of easily forming a protective film at a low temperature and having improved physical properties such as chemical resistance.

SUMMARY

In order to solve the above problems, it is an object of the invention to provide a photo-curable organic-inorganic hybrid resin composition having superior physical properties such as UV resistance, chemical resistance, light transmittance, adhesive property, insulating property, heat resistance, flatness and water resistance and in particular, being capable of withstanding a thermal deformation caused by a processing temperature change during post-process after a film is cured, and a method of forming substrate pattern using the same.

It is an object of the invention to provide a photo-curable organic-inorganic hybrid resin composition with superior physical properties such as chemical resistance, UV resistance, water resistance, heat resistance, light transmittance and adhesive property, suitable for an encapsulating material used in packaging process for semiconductors and LED, and an encapsulation method using the same.

To achieve these objects, the present invention provides a photo-curable organic-inorganic hybrid resin composition comprising (1) a poly aliphatic aromatic silsesquioxane containing an ethylenically unsaturated group and a fluorine group of chemical formula 1:

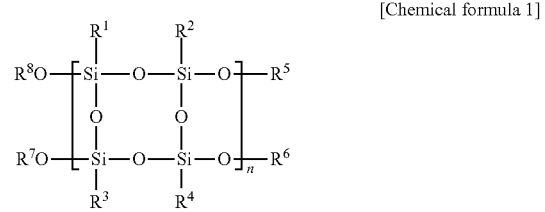

[Chemical formula 1]

wherein $R^1$ to $R^4$ each independently represent a hydrogen atom; or an alkyl group or alkoxy group of $C_{1-20}$ substituted or unsubstituted with an ethylenically unsaturated group of $C_{2-20}$, a fluorine, or an aromatic group of $C_{6-20}$, wherein at least one of $R^1$ to $R^4$ is the alkyl group or alkoxy group containing an ethylenically unsaturated group, and at least one of $R^1$ to $R^4$ is the alkyl or alkoxy group of $C_{1-20}$ containing a fluorine, n is an integer of 1-30, and $R^5$ to $R^8$ are each independently a hydrogen atom, or an alkyl or alkoxy group of $C_{1-20}$;

(2) a reactive monomer containing at least one unsaturated group in the molecule;

(3) an organic silane compound of chemical formula 2:

$$R^9_{4-m}\text{-}Q_p\text{-}Si\text{---}(OR^{10})_m \qquad \text{[Chemical formula 2]}$$

wherein $R^9$ is selected from the group consisting a phenyl group, an amino group, a (meth)acryl group, a vinyl group, an epoxy group and a combination thereof, $R^{10}$ is selected from the group consisting of an alkyl group of $C_{1-5}$, a cycloalkyl group of $C_{3-10}$, an aryl group of $C_{6-12}$, —OCR', —CR'=N—OH, and a combination thereof, wherein R' is an alky group of $C_{1-6}$, Q is an alkylene group of $C_{2-6}$ or an alkyleneoxy group of $C_{2-6}$, m is an integer of 0 to 4, and p is an integer of 0 or 1; and (4) a photo initiator.

Further, the invention provides a method of forming substrate pattern using the organic-inorganic hybrid resin composition.

Further, the invention provides a method of encapsulating a semiconductor or LED using the organic-inorganic hybrid resin composition.

The photo-curable organic-inorganic hybrid resin composition according to the invention has superior physical properties such as UV resistance, chemical resistance, light transmittance, adhesive property, insulating property, heat resistance, flatness and water resistance and in particular, it has excellent heat resistance and adhesive property enabling the composition to endure a thermal deformation caused by a processing temperature change during post-processing after a film is cured so that it is suitable for use as an insulating material and an encapsulating material for a protective film of optical devices including display devices and semiconductors.

DETAILED DESCRIPTION

The photo-curable organic-inorganic hybrid resin composition according to the invention is characterized by comprising (1) a poly aliphatic aromatic silsesquioxane containing an ethylenically unsaturated group and a fluorine group of chemical formula 1:

[Chemical formula 1]

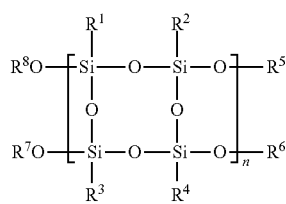

wherein $R^1$ to $R^4$ each independently represent a hydrogen atom; or an alkyl group or alkoxy group of $C_{1-20}$ substituted or unsubstituted with an ethylenically unsaturated group of $C_{2-20}$, a fluorine, or an aromatic group of $C_{6-20}$, wherein at least one of $R^1$ to $R^4$ is the alkyl group or alkoxy group containing an ethylenically unsaturated group, and at least one of $R^1$ to $R^4$ is the alkyl or alkoxy group of $C_{1-20}$ containing a fluorine, n is an integer of 1-30, and $R^5$ to $R^8$ are each independently a hydrogen atom, or an alkyl or alkoxy group of $C_{1-20}$;

(2) a reactive monomer containing at least one unsaturated group in the molecule;

(3) an organic silane compound of chemical formula 2:

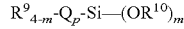  [Chemical formula 2]

wherein $R^9$ is selected from the group consisting a phenyl group, an amino group, a (meth)acryl group, a vinyl group, an epoxy group and a combination thereof, $R^{10}$ is selected from the group consisting of an alkyl group of $C_{1-5}$, a cycloalkyl group of $C_{3-10}$, an aryl group of $C_{6-12}$, —OCR', —CR'=N—OH, and a combination thereof, wherein R' is an alky group of $C_{1-6}$, Q is an alkylene group of $C_{2-6}$ or an alkyleneoxy group of $C_{2-6}$, m is an integer of 0 to 4, and p is an integer of 0 or 1; and (4) a photo initiator.

Preferably, the photo-curable organic-inorganic hybrid resin composition may comprise each component in following amounts:

(1) 30 to 80 parts by weight of the poly aliphatic aromatic silsesquioxane containing an ethylenically unsaturated group and a fluorine group of chemical formula 1;

(2) 5 to 50 parts by weight of the reactive monomer containing at least one unsaturated group in the molecule;

(3) 5 to 50 parts by weight of the organic silane compound of chemical formula 2; and (4) 0.1 to 10 parts by weight of the photo initiator with regard to 100 parts by weight of the total sum amount of (1), (2), and (3) components.

Hereafter, each component will be described in detail.

(1) Poly Aliphatic Aromatic Silsesquioxane Containing Ethylenically Unsaturated Group and Fluorine Group Preferably, the poly aliphatic aromatic silsesquioxane containing an ethylenically unsaturated group and a fluorine group to be used in the photo-curable organic-inorganic hybrid resin composition of the invention may have at least one ethylenically unsaturated group and at least one fluorine group in the molecule, and it may be a compound having a ladder or cage structure of weight average molecular weight of 1,000 to 200,000.

The poly aliphatic aromatic silsesquioxane containing an ethylenically unsaturated group and a fluorine group may be represented by chemical formula 1:

[Chemical formula 1]

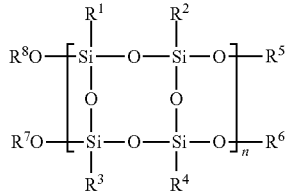

wherein $R^1$ to $R^8$ and n are as defined above.

The poly aliphatic aromatic silsesquioxane containing an ethylenically unsaturated group and a fluorine group of chemical formula 1 may be included preferably in an amount of 30 to 80 parts by weight in the photo-curable organic-inorganic hybrid resin composition of the invention.

If the amount of the silsesquioxane compound to be used is less than 30 parts by weight, chemical resistance and release performance of the composition might be deteriorated, and if it exceeds 80 parts by weight, processing performance may be deteriorated.

(2) Reactive Monomer Containing at Least One Ethylenically Unsaturated Group in the Molecule The reactive monomer containing at least one ethylenically unsaturated group in the molecule to be used in the photo-curable organic-inorganic hybrid resin composition of the invention may be at least one among an unsaturated carbonic acid, unsaturated carbonic acid anhydride and acryl unsaturated compound containing at least one ethylenically unsaturated group in the molecule. Preferably, a reactive monomer containing a (meth)acryl group, or an epoxy group together with at least one ethylenically unsaturated group may be used.

The reactive monomer containing a (meth)acryl group may include methylmethacrylate, ethylmethacrylate, n-butyl methacrylate, sec-butyl methacrylate, tert-butyl methacrylate, methylacrylate, isopropyl acrylate, cyclohexyl methacrylate, 2-methylcyclo hexylmethacrylate, dicyclopentenylacrylate, dicyclopentanylacrylate, dicyclopentenylmethacrylate, dicyclopentanylmethacrylate, 1-adamantyl acrylate, 1-adamantyl methacrylate, dicyclopentanyloxyethylmethacrylate, isoboronylmethacrylate, cyclohexylacrylate, 2-methyl cyclohexylacrylate, dicyclopentanyloxyethylacrylate, isoboronylacrylate, phenylmethacrylate, phenylacrylate, benzylacrylate, 2-hydroxy ethylmethacrylate, 1,6-hexanedioldiacrylate, etc.

The reactive monomer containing an epoxy group may include glycidyl acrylate, glycidyl methacrylate, α-ethylglycidyl acrylate, α-n-propylglycidyl acrylate, α-n-butylglycidyl acrylate, acrylic acid-β-methyl glycidyl, methacrylic acid-β-methyl glycidyl, acrylic acid-β-ethyl glycidyl, methacrylic acid-β-ethyl glycidyl, acrylic acid-3,4-epoxybutyl, methacrylic acid-3,4-epoxybutyl, acrylic acid-6,7-epoxy heptyl, methacrylic acid-6,7-epoxy heptyl, α-ethyl acrylic acid-6,7-epoxy heptyl, acrylic acid-3,4-epoxy cyclohexylmethyl, methacrylic acid-3,4-epoxy cyclohexylmethyl, o-vinylbenzylglycidylether, m-vinylbenzylglycidylether, p-vinylbenzylglycidylether, etc.

The reactive monomer containing at least one ethylenically unsaturated group in the molecule as described above may be used alone or in a mixture or two or more.

The reactive monomer containing at least one ethylenically unsaturated group in the molecule in the invention may be included preferably in an amount of 5 to 50 parts by weight, more preferably 10 to 45 parts by weight in the resin mold composition.

If the amount of the reactive monomer to be used is less than 5 parts by weight, it may cause poor processing, and if it exceeds 50 parts by weight, chemical resistance and mechanical strength may be deteriorated.

Preferably, the photo-curable organic-inorganic resin composition of the invention may further include a reactive monomer containing at least one fluorine group in the molecule together with the reactive monomer containing at least one ethylenically unsaturated group in the molecule.

The reactive monomer containing at least one fluorine group in the molecule may be at least one among an unsaturated carbonic acid, unsaturated carbonic acid anhydride and acryl unsaturated compound containing at least one fluorine group in the molecule. Preferably, a reactive monomer containing at least one fluorine group, and a (meth)acryl group or an epoxy group may be used.

Specifically, the reactive monomer containing a fluorine group may include perfluorohexylethylene, 1,4-divinyldodecafluorohexane, 3-perfluorobutylhydroxypropylmethacrylate, 3-perfluorohexylhydroxylpropylmethacrylate, trifluoroethylmethacrylate, tetrafluoropropylmethacrylate, 2-perfluorohexylethylacrylate, 3-perfluoromethylbutyl-2-hydroxypropylacrylate, and derivatives thereof.

Also, the reactive monomer containing a (meth)acryl group to be coupled with the fluorine group may include methylmethacrylate, ethylmethacrylate, n-butylmethacrylate, sec-butyl methacrylate, tert-butyl methacrylate, methylmethacrylate, isopropyl acrylate, cyclohexyl methacrylate, 2-methylcyclo hexylmethacrylate, dicyclopentenylacrylate, dicyclopentanylacrylate, dicyclopentenylmethacrylate, dicyclopentanylmethacrylate, 1-adamantyl acrylate, 1-adamantyl methacrylate, dicyclopentanyloxyethylmethacrylate, isoboronylmethacrylate, cyclohexylacrylate, 2-methylcyclohexylacrylate, dicyclopentanyloxyethylacrylate, isoboronylacrylate, phenylmethacrylate, phenylacrylate, benzylacrylate, 2-hydroxyethylmethacrylate, 1,6-hexanedioldiacrylate, etc.

The reactive monomer containing an epoxy group to be coupled with the fluorine group may include glycidyl acrylate, glycidyl methacrylate, α-ethylglycidyl acrylate, α-n-propylglycidyl acrylate, α-n-butylglycidyl acrylate, acrylic acid-β-methyl glycidyl, methacrylic acid-β-methyl glycidyl, acrylic acid-β-ethyl glycidyl, methacrylic acid-β-ethyl glycidyl, acrylic acid-3,4-epoxybutyl, methacrylic acid-3,4-epoxybutyl, acrylic acid-6,7-epoxy heptyl, methacrylic acid-6,7-epoxy heptyl, α-ethyl acrylic acid-6,7-epoxy heptyl, acrylic acid-3,4-epoxy cyclohexylmethyl, methacrylic acid-3,4-epoxy cyclohexylmethyl, o-vinylbenzylglycidylether, m-vinylbenzylglycidylether, p-vinylbenzylglycidylether, etc.

The reactive monomer containing at least one fluorine group in the molecule as described above may be used alone or in a mixture of two or more.

The reactive monomer containing at least one fluorine group in the molecule in the invention may be included preferably in an amount of 5 to 50 parts by weight, more preferably 10 to 45 parts by weight in the composition. Within the above ranges, good viscosity, chemical resistance and other physical properties are obtained.

(3) Organic Silane Compound

The organic silane compound to be used in the photo-curable organic-inorganic hybrid resin composition of the invention may be an organic silane compound containing a phenyl group, an amino group, a (meth)acryl group, a vinyl group or an epoxy group.

Specifically, the organic silane compound is a compound having the structure of chemical formula 2:

$$R^9{}_{4-m}\text{-}Q_p\text{-Si}-(OR^{10})_m \qquad \text{[chemical formula 2]}$$

wherein $R^9$, $R^{10}$, m and p are as defined above.

Among the organic silane compounds, the organic silane compound containing a phenyl group or an amino group can improve non-swelling effects by increasing the chemical resistance of the composition, and the organic silane compound containing an epoxy group or a (meth)acryl group can improve the mechanical strength and hardening degree of a cured layer by increasing the hardening density of the composition.

Specifically, the organic silane compound may include (3-glycidoxypropyl)trimethoxysilane, (3-glycidoxypropyl)triethoxysilane, (3-glycidoxypropyl)methyldimethoxysilane, (3-glycidoxypropyl)dimethylethoxysilane, 3-(methacryloxy)proppyltrimethoxysilane, 3,4-epoxybutyltrimethoxysilane, 3,4-epoxybutyltriethoxysilane, 2-(3,4-epoxycyclohexyl)ethyltrimethoxysilane, 2-(3,4-epoxycyclohexyl)ethyltriethoxysilane, aminopropyltriethoxysilane, vinyltriethoxysilane, vinyltri-t-butoxysilane, vinyltriisobutoxysilane, vinyltriisopropoxysilane, vinyltriphenoxysilane, phenyltriethoxysilane, phenyltrimethoxysilane, aminopropyltrimethoxysilane, N-phenyl-3-aminopropyltrimethoxysilane, etc., and it may be used alone or in a combination of two or more. For the physical properties of the finally-produced composition, it is more preferable to use a mixture of two or more.

Preferably, the organic silane compound as described above may be included in an amount of 5 to 50 parts by weight in the composition. If the amount of the organic silane compound is less than 5 parts by weight, the effect obtained from the use of the organic silane compound is minimal, and if it exceeds 50 parts by weight, the viscosity decreases, thereby causing difficulty in operation, and cracks might occur during coating process.

(4) Photo Initiator

The photo initiator to be used in the invention may be any ordinary photo initiators to be used in photo-curable resin compositions and specifically, there may be used Irgacure 369 (Ciba Specialty Chemicals, Inc.), Irgacure 651, Irgacure 907, Irgacure 819, diphenyl-(2,4,6-trimethylbenzoyl)phosphineoxide, methylbenzoylformate, ethyl(2,4,6-trimethylbenzoyl)phenylphosphinate, 2,4-bistrichloromethyl-6-p-methoxystyryl-s-triazine, 2-p-methoxystyryl-4,6-bistrichloromethyl-s-triazine, 2,4-trichloromethyl-6-triazine, 2,4-trichloromethyl-4-methylnaphthyl-6-triazine, benzophenone, p-(diethylamino)benzophenone, 2,2-dichloro-4-phenoxyacetophenone, 2,2-diethoxyacetophenone, 2-dodecylthioxanthone, 2,4-dimethylthioxanthone, 2,4-diethylthioxanthone, or 2,2-bis(2-chlorophenyl)-4,4,5,5-tetraphenyl-1,2-biimidazole, and they may be used alone or in a combination of two or more.

The photo initiator may be included preferably in an amount of 0.1-10 parts by weight with regard to 100 parts by weight of the total sum amount of above components (1), (2) and (3), and when it is included in an amount within the above range, it can satisfy post-curing transmittance and coating stability at the same time.

The photo-curable organic-inorganic hybrid resin composition comprising components (1) to (4) as described above according to the present invention may further comprise a surfactant to enhance coating performance.

The surfactant may include polyoxyethyleneoctylphenylether, polyoxyethylenenonylphenylether, F171 (Dainippon Ink Inc.), F172, F173, FC430 (Sumitomo Three M Inc.), FC431, KP341 (Shin-Etsu Chemical Co., Ltd.), etc. and the content thereof may be preferably 0.01-2 parts by weight with regard to 100 parts by weight of the total sum amount of the above components (1), (2), (3), and (4).

Also, the invention provides a method of forming substrate pattern using the photo-curable organic-inorganic hybrid resin composition. In the pattern formation method of the invention, any ordinary pattern formation methods can be applied except using the above photo-curable organic-inorganic hybrid resin composition as a composition for the protective film of a substrate, and the substrate may be optical devices including display devices such as a liquid crystal display, TFT, and OLED.

Also, the invention provides a method of encapsulating a semiconductor or LED using the photo-curable organic-inorganic hybrid resin composition. In the encapsulation method of the invention, any ordinary encapsulation methods can be applied except using the above photo-curable organic-inorganic hybrid resin composition as an encapsulating material.

For better understanding of the present invention, preferred embodiments follow. The following examples are intended to merely illustrate the invention without limiting the scope of the invention.

EXAMPLES

Synthesis: Preparation of Poly Aliphatic Aromatic Silsesquioxane Containing Ethylenically Unsaturated Group and Fluorine Group

[Synthesis 1-a]

15 parts by weight of a distilled water, 85 parts by weight of methanol (purity 99.86%), 1 part by weight of tetramethylammoniumhydroxide (purity 25%), 20 parts by weight of trimethoxyphenylsilane (Dow Corning Co., Product name DOW CORNING® Z-6124 SILANE), 35 parts by weight of gamma-methacryloxypropyltrimethoxysilane (Dow Corning Co., Product name DOW CORNING® Z-6030 SILANE), 70 parts by weight of methyltrimethoxy silane (Dow Corning Co., Product name DOW CORNING® Z-6300 SILANE), and 10 parts by weight of perfluorooctyltriethoxysilane (Product name DYNASYLAN® F-8261) were added to a dried flask equipped with a cooling tube and a stirrer, and slowly stirred under nitrogen atmosphere for 8 hours, and then after the addition of 150 parts by weight of dichloromethane (purity 99.5%, Dong Yang Chemical Co., Ltd.), they were further stirred for 2 hours.

The stirred solution was rinsed several times with a distilled water to eliminate impurities and then the rinsed liquid was dried under vacuum at a room temperature for more than 20 hours to prepare an intended poly aliphatic aromatic silsesquioxane containing an ethylenically unsaturated group and a fluorine group (1a) having styrene equivalent molecular weight of 25,000.

[Synthesis 1-b]

15 parts by weight of a distilled water, 85 parts by weight of methanol (purity 99.86%), 1 part by weight of tetramethylammoniumhydroxide (purity 25%), 20 parts by weight of trimethoxyphenylsilane (Dow Corning Co., Product name DOW CORNING® Z-6124 SILANE), 70 parts by weight of gamma-methacryloxypropyltrimethoxysilane (Dow Corning Co., Product name DOW CORNING® Z-6030 SILANE), 30 parts by weight of methyltrimethoxy silane (Dow Corning Co., Product name DOW CORNING® Z-6300 SILANE), and 30 parts by weight of perfluorooctyltriethoxysilane (Product name DYNASYLAN® F-8261) were added to a dried flask equipped with a cooling tube and a stirrer, and slowly stirred under nitrogen atmosphere for 8 hours, and then after the addition of 150 parts by weight of dichloromethane (purity 99.5%, Dong Yang Chemical Co., Ltd.), they were further stirred for 2 hours.

The stirred solution was rinsed several times with a distilled water to eliminate impurities and then the rinsed liquid was dried under vacuum at a room temperature for more than 20 hours to prepare an intended poly aliphatic aromatic silsesquioxane containing an ethylenically unsaturated group and a fluorine group (1b) having styrene equivalent molecular weight of 25,000.

Example 1

30 parts by weight of poly aliphatic aromatic silsesquioxane containing an ethylenically unsaturated group and a fluorine group (1a) obtained from [synthesis 1-a], 23 parts by weight of 2-(perfluorohexyl)ethylacrylate, 23 parts by weight of glycidyl methacrylate and 24 parts by weight of (3-glycidoxypropyl)trimethoxysilane, and 1 part of by weight of ethyl(2,4,6-trimethylbenzoyl)phenylphosphinate as a photo initiator were added, evenly stirred at 300-400 rpm at a room temperature for 20 hours, and filtered with a millipore filter having the pore diameter of 0.45 μm to prepare a photo-curable organic-inorganic hybrid resin composition. The appearance of this composition solution was colorless and transparent.

Example 2

With the exception that 55 parts by weight of poly aliphatic aromatic silsesquioxane containing an ethylenically unsaturated group and a fluorine group (1a) obtained from [synthesis 1-a], 15 parts by weight of 2-(perfluorohexyl)ethylacrylate, 15 parts by weight of glycidyl methacrylate and 15 parts by weight of (3-glycidoxypropyl)

trimethoxysilane, and 1 part of by weight of ethyl(2,4,6-trimethylbenzoyl)phenylphosphinate as a photo initiator were used, the same method as Example 1 above was carried out to prepare a photo-curable organic-inorganic hybrid resin composition.

Example 3

With the exception that 70 parts by weight of poly aliphatic aromatic silsesquioxane containing an ethylenically unsaturated group and a fluorine group (1a) obtained from [synthesis 1-a], 10 parts by weight of 2-(perfluorohexyl)ethylacrylate, 10 parts by weight of glycidyl methacrylate and 10 parts by weight of (3-glycidoxypropyl) trimethoxysilane, and 1 part of by weight of ethyl(2,4,6-trimethylbenzoyl)phenylphosphinate as a photo initiator were used, the same method as Example 1 above was carried out to prepare a photo-curable organic-inorganic hybrid resin composition.

Example 4

With the exception that 30 parts by weight of poly aliphatic aromatic silsesquioxane containing an ethylenically unsaturated group and a fluorine group (1a) obtained from [synthesis 1-b], 23 parts by weight of 2-(perfluorohexyl)ethylacrylate, 23 parts by weight of glycidyl methacrylate and 24 parts by weight of (3-glycidoxypropyl) trimethoxysilane, and 1 part of by weight of ethyl(2,4,6-trimethylbenzoyl)phenylphosphinate as a photo initiator were used, the same method as Example 1 above was carried out to prepare a photo-curable organic-inorganic hybrid resin composition.

Example 5

With the exception that 55 parts by weight of poly aliphatic aromatic silsesquioxane containing an ethylenically unsaturated group and a fluorine group (1a) obtained from [synthesis 1-b], 15 parts by weight of 2-(perfluorohexyl)ethylacrylate, 15 parts by weight of glycidyl methacrylate and 15 parts by weight of (3-glycidoxypropyl) trimethoxysilane, and 1 part of by weight of ethyl(2,4,6-trimethylbenzoyl)phenylphosphinate as a photo initiator were used, the same method as Example 1 above was carried out to prepare a photo-curable organic-inorganic hybrid resin composition.

Example 6

With the exception that 70 parts by weight of poly aliphatic aromatic silsesquioxane containing an ethylenically unsaturated group and a fluorine group (1a) obtained from [synthesis 1-b], 10 parts by weight of 2-(perfluorohexyl)ethylacrylate, 10 parts by weight of glycidyl methacrylate and 10 parts by weight of (3-glycidoxypropyl) trimethoxysilane, and 1 part of by weight of ethyl(2,4,6-trimethylbenzoyl)phenylphosphinate as a photo initiator were used, the same method as Example 1 above was carried out to prepare a photo-curable organic-inorganic hybrid resin composition.

Comparative Example 1

With the exception that 33 parts by weight of 2-(perfluorohexyl)ethylacrylate, 33 parts by weight of glycidyl methacrylate and 34 parts by weight of (3-glycidoxypropyl) trimethoxysilane, and 1 part of by weight of ethyl(2,4,6-trimethylbenzoyl)phenylphosphinate as a photo initiator were used, the same method as Example 1 above was carried out to prepare a resin composition.

Comparative Example 2

With the exception that 10 parts by weight of poly aliphatic aromatic silsesquioxane containing an ethylenically unsaturated group and a fluorine group (1a) obtained from [synthesis 1-a], 30 parts by weight of 2-(perfluorohexyl)ethylacrylate, 30 parts by weight of glycidyl methacrylate and 30 parts by weight of (3-glycidoxypropyl) trimethoxysilane, and 1 part of by weight of ethyl(2,4,6-trimethylbenzoyl)phenylphosphinate as a photo initiator were used, the same method as Example 1 above was carried out to prepare a resin composition.

Comparative Example 3

With the exception that 100 parts by weight of poly aliphatic aromatic silsesquioxane containing an ethylenically unsaturated group and a fluorine group (1a) obtained from [synthesis 1-a], and 1 part of by weight of ethyl(2,4,6-trimethylbenzoyl)phenylphosphinate as a photo initiator were used, the same method as Example 1 above was carried out to prepare a resin composition.

Using the resin compositions prepared in above Examples 1 to 6, and Comparative Examples 1 to 3, water resistance, chemical resistance, UV resistance, adhesive strength, heat resistance, and light transmittance were measured according to the following methods and the results are shown in Table 1 below.

The compositions were applied onto a glass substrate using a spin coater, cured by UV radiation under nitrogen atmosphere, and then placed in a convection oven of 100° C. and further heated for one hour to obtain final coating films.

A) Water resistance: The resin compositions prepared in above Examples 1 to 6, and Comparative Examples 1 to 3 were cured by UV radiation, and placed in a convection oven of 100° C. and further heated for one hour to obtain cured specimens having the thickness of 100 μm. The cured specimens were measured using MOCON TEST equipment. As measurement results, in the case that water vapor transmission rate is less than 10 g/m$^2$·day, it is marked ⊚, in the case of 10-20 g/m$^2$·day, marked ○, in the case of 20-30 g/m$^2$·day, marked Δ, and in the case of not less than 30 g/m$^2$·day, marked X in the Table.

B) Chemical resistance: The formed final coating films were completely immersed in acetone and allowed to stay for 7 days and after that, weight changes in the resin molds were measured. In the case that a weight change rate compared to the initial weight is 0-1%, it is marked ⊚, in the case of 1-3%, marked ○, in the case of 3-5%, marked Δ, and in the case of not less than 5%, marked X in the Table.

C) UV resistance: The formed final coating films were subject to UV radiation for 30 hours. Light transmittance of the protective films was measured before and after UV radiation, and in the case that a change rate is 0-1%, it is marked ⊚, in the case of 1-3%, marked ○, in the case of 3-5%, marked Δ, and in the case of not less than 5%, marked X in the Table.

D) Adhesive strength: Adhesive strength was measured by a taping test using 3M tapes with regard to the finally-cured films after applying the protective film resin compositions to Mo, Al, and ITO substrates. The coating films were divided at regular intervals into 100 cells, which 3M tapes were attached to and then slowly taken off. Among the 100 cells, if the number of the remaining cells is not less than 95, it is marked 'superior,' if it is less than 95 and not less than 90, 'good,' if it is less than 90 and not less than 80, 'average,' and if it is less than 80, 'poor.'

E) Heat resistance: The finally-formed coating films were scratched to measure TGA. The temperatures of points at which weight loss rate is 5% were measured. In the case that temperature is not lower than 300° C., it is marked 'superior,' in the case of not lower than 280° C., 'good,' in the case of not lower than 250° C., 'average,' and in the case of not greater than 250° C., 'poor.'

F) Light transmittance: Light absorption spectrum of visible light was measured with the finally-formed coating films, and light transmittances at 400 nm were recorded.

TABLE 1

| | Water resistance | Chemical resistance | UV resistance | Adhesive strength | Heat resistance | Light transmittance |
|---|---|---|---|---|---|---|
| Ex. 1 | ○ | ○ | ○ | Superior | Good | 97.5 |
| Ex. 2 | ○ | ◎ | ○ | Superior | Superior | 98.7 |
| Ex. 3 | ◎ | ◎ | ◎ | Good | Superior | 96.3 |
| Ex. 4 | ○ | ◎ | ○ | Superior | Good | 97.0 |
| Ex. 5 | ◎ | ◎ | ◎ | Superior | Superior | 98.8 |
| Ex. 6 | ◎ | ◎ | ◎ | Good | Superior | 97.4 |
| Com. Ex. 1 | X | X | X | Superior | Poor | 95.8 |
| Com. Ex. 2 | Δ | Δ | Δ | Superior | Poor | 96.3 |
| Com. Ex. 3 | Δ | Δ | X | Average | Superior | 97.2 |

As shown in Table 1 above, the coating films obtained from the photo-curable organic-inorganic hybrid resin compositions of Examples 1 to 6 of the invention were superior in terms of water resistance, chemical resistance, UV resistance and heat resistance, compared to Comparative Examples 1 to 3, and they also exhibited superior adhesive strength and light transmittance.

The photo-curable organic-inorganic hybrid resin composition of the invention has superior physical properties such as UV resistance, chemical resistance, light transmittance, adhesive property, insulating property, heat resistance, flatness and water resistance and in particular, it has excellent heat resistance and adhesive property enabling the composition to endure a thermal deformation caused by a processing temperature change during post-processing after film is cured so that it is suitable for use as an insulating material and an encapsulating material for a protective film of optical devices including display devices and semiconductors.

The invention claimed is:

1. A photo-curable organic-inorganic hybrid resin composition comprising:
   (1) a poly aliphatic aromatic silsesquioxane containing an ethylenically unsaturated group and a fluorine group of chemical formula 1:

[Chemical formula 1]

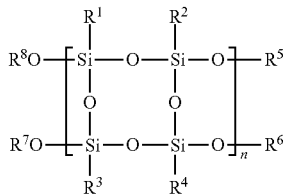

wherein $R^1$ to $R^4$ each independently represent a hydrogen atom; or an alkyl group or alkoxy group of $C_{1-20}$ substituted or unsubstituted with an ethylenically unsaturated group of $C_{2-20}$, a fluorine, or an aromatic group of $C_{6-20}$, wherein at least one of $R^1$ to $R^4$ is the alkyl group or alkoxy group containing an ethylenically unsaturated group, and at least one of $R^1$ to $R^4$ is the alkyl or alkoxy group of $C_{1-20}$ containing a fluorine,
   n is an integer of 1-30, and
   $R^5$ to $R^8$ are each independently a hydrogen atom, or an alkyl or alkoxy group of $C_{1-20}$;
   (2) a reactive monomer containing at least one unsaturated group in the molecule;
   (3) an organic silane compound of chemical formula 2:

$$R^9{}_{4-m}\text{-}Q_p\text{-}Si\text{—}(OR^{10})_m$$ [Chemical formula 2]

wherein $R^9$ is selected from the group consisting a phenyl group, an amino group, a (meth)acryl group, a vinyl group, an epoxy group and a combination thereof,
   $R^{10}$ is selected from the group consisting of an alkyl group of $C_{1-5}$, a cycloalkyl group of $C_{3-10}$, an aryl group of $C_{6-12}$, —OCR', —CR'=N—OH, and a combination thereof, wherein R' is an alky group of $C_{1-6}$,
   Q is an alkylene group of $C_{2-6}$ or an alkyleneoxy group of $C_{2-6}$,
   m is an integer of 0 to 4, and
   p is an integer of 0 or 1; and
   (4) a photo initiator,
   wherein the reactive monomer containing at least one unsaturated group in the molecule of (2) is a reactive monomer containing a (meth)acryl group, or an epoxy group together with at least one unsaturated group; and
   wherein the photo-curable organic-inorganic hybrid resin composition further comprises a reactive monomer containing at least one fluorine group in the molecule.

2. The photo-curable organic-inorganic hybrid resin composition as claimed in claim 1, wherein the photo-curable organic-inorganic hybrid resin comprises
   (1) 30 to 80 parts by weight of the poly aliphatic aromatic silsesquioxane containing an ethylenically unsaturated group and a fluorine group of chemical formula 1;
   (2) 5 to 50 parts by weight of the reactive monomer containing at least one unsaturated group in the molecule;
   (3) 5 to 50 parts by weight of the organic silane compound of chemical formula 2; and
   (4) 0.1 to 10 parts by weight of the photo initiator with regard to 100 parts by weight of the total sum amount of (1), (2), and (3) components.

3. The photo-curable organic-inorganic hybrid resin composition as claimed in claim 1, wherein the poly aliphatic aromatic silsesquioxane of (1) is a compound having a ladder or cage structure of weight average molecular weight of 1,000 to 200,000.

4. The photo-curable organic-inorganic hybrid resin composition as claimed in claim 1, wherein the reactive monomer containing a fluorine group is at least one selected from the group consisting of perfluorohexylethylene, 1,4-divinyl-dodecafluorohexane, 3-perfluorobutylhydroxypropylmethacrylate, 3-perfluorohexylhydroxylpropylmethacrylate, trifluoroethylmethacrylate, tetrafluoropropylmethacrylate, 2-perfluorohexylethylacrylate, 3-perfluoromethylbutyl-2-hydroxypropylacrylate, and derivatives thereof.

5. The photo-curable organic-inorganic hybrid resin composition as claimed in claim 1, wherein the reactive monomer containing a (meth)acryl group is at least one selected from the group consisting of methylmethacrylate, ethylmethacrylate, n-butyl methacrylate, sec-butyl methacrylate, tert-butyl methacrylate, methylacrylate, isopropyl acrylate, cyclohexyl methacrylate, 2-methyl cyclo hexylmethacrylate, dicyclopentenylacrylate, dicyclopentanylacrylate, dicyclopentenylmethacrylate, dicyclopentanylmethacrylate, 1-adamantyl acrylate, 1-adamantyl methacrylate, dicyclopentanyloxyethylmethacrylate, isoboronylmethacrylate, cyclohexylacrylate, 2-methyl cyclohexylacrylate, dicyclopentanyloxyethylacrylate, isoboronylacrylate, phenylmethacrylate, phenylacrylate, benzylacrylate, 2-hydroxy ethylmethacrylate, and 1,6-hexanedioldiacrylate.

6. The photo-curable organic-inorganic hybrid resin composition as claimed in claim 1, wherein the reactive monomer containing an epoxy group is at least one selected from the group consisting of glycidyl acrylate, glycidyl methacrylate, α-ethylglycidyl acrylate, α-n-propylglycidyl acrylate, α-n-butylglycidyl acrylate, acrylic acid-β-methyl glycidyl, methacrylic acid-β-methyl glycidyl, acrylic acid-β-ethyl glycidyl, methacrylic acid-β-ethyl glycidyl, acrylic acid-3,4-epoxybutyl, methacrylic acid-3,4-epoxybutyl, acrylic acid-6,7-epoxy heptyl, methacrylic acid-6,7-epoxy heptyl, α-ethyl acrylic acid-6,7-epoxy heptyl, acrylic acid-3,4-epoxy cyclohexylmethyl, methacrylic acid-3,4-epoxy cyclohexylmethyl, o-vinylbenzylglycidyl ether, m-vinylbenzylglycidylether, and p-vinylbenzylglycidylether.

7. The photo-curable organic-inorganic hybrid resin composition as claimed in claim 1, wherein the organic silane compound of (3) is an organic silane compound containing a phenyl group, an amino group, a (meth)acryl group, a vinyl or an epoxy group.

8. The photo-curable organic-inorganic hybrid resin composition as claimed in claim 7, wherein the organic silane compound is at least one selected from the group consisting of (3-glycidoxypropyl)trimethoxysilane, (3-glycidoxypropyl)triethoxysilane, (3-glycidoxypropyl)methyldimethoxysilane, (3-glycidoxypropyl)dimethylethoxysilane, 3-(methacryloxy)proppyltrimethoxysilane, 3,4-epoxybutyltrimethoxysilane, 3,4-epoxybutyltriethoxysilane, 2-(3,4-epoxycyclohexyl)ethyltrimethoxysilane, 2-(3,4-epoxycyclohexyl)ethyltriethoxysilane, aminopropyltriethoxysilane, vinyltriethoxysilane, vinyltri-t-butoxysilane, vinyltriisobutoxysilane, vinyltriisopropoxysilane, vinyltriphenoxysilane, phenyltriethoxysilane, phenyltrimethoxysilane, aminopropyltrimethoxysilane, and N-phenyl-3-aminopropyltrimethoxysilane.

9. The photo-curable organic-inorganic hybrid resin composition as claimed in claim 1, wherein the photo initiator of (4) is at least one selected from the group consisting of diphenyl-(2,4,6-trimethylbenzoyl)phosphineoxide, methylbenzoylformate, ethyl(2,4,6-trimethylbenzoyl)phenylphosphinate, 2,4-bistrichloromethyl-6-p-methoxystyryl-s-triazine, 2-p-methoxystyryl-4,6-bistrichloromethyl-s-triazine, 2,4-trichloromethyl-6-triazine, 2,4-trichloromethyl-4-methylnaphthyl-6-triazine, benzophenone, p-(diethylamino)benzophenone, 2,2-dichloro-4-phenoxyacetophenone, 2,2-diethoxyacetophenone, 2-dodecylthioxanthone, 2,4-dimethylthioxanthone, 2,4-diethylthioxanthone, and 2,2-bis(2-chlorophenyl)-4,4,5,5-tetraphenyl-1,2-diimidazole.

10. The photo-curable organic-inorganic hybrid resin composition as claimed in claim 1, wherein the photo-curable organic-inorganic hybrid resin composition further comprises a surfactant selected from the group consisting of polyoxyethyleneoctylphenylether, polyoxyethylenenonylphenylether, and a combination thereof.

11. The photo-curable organic-inorganic hybrid resin composition as claimed in claim 1, wherein the photo-curable organic-inorganic hybrid resin composition is a composition for the protective film of display devices.

12. A pattern formation method using the photo-curable organic-inorganic hybrid resin composition of claim 1.

13. An encapsulation method using the photo-curable organic-inorganic hybrid resin composition of claim 1.

* * * * *